July 31, 1934.                     F. C. VEITH ET AL                  1,968,471
                                   ADJUSTABLE WHEEL LUG
                          Filed Nov. 10, 1933         2 Sheets-Sheet 1

Inventors
Ferdinand C. Veith,
Henry C. Bowen,

By Clarence A. O'Brien
Attorney

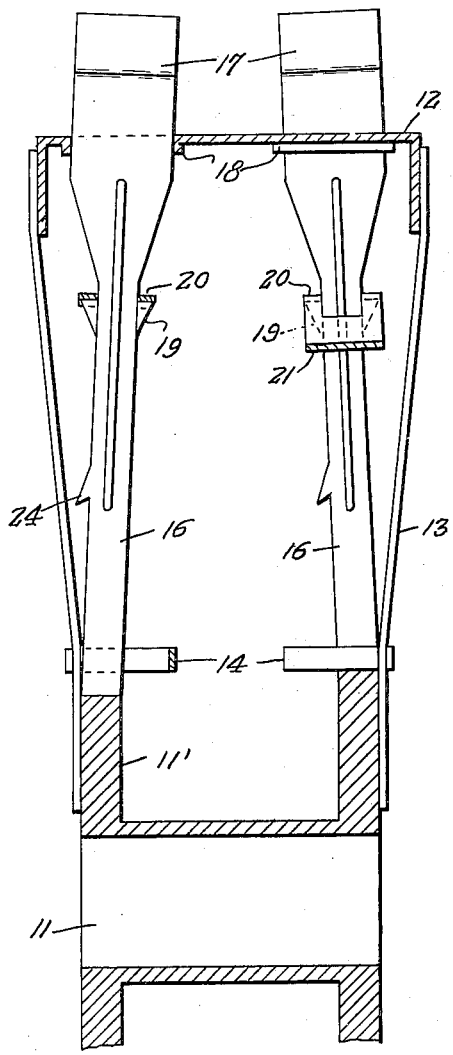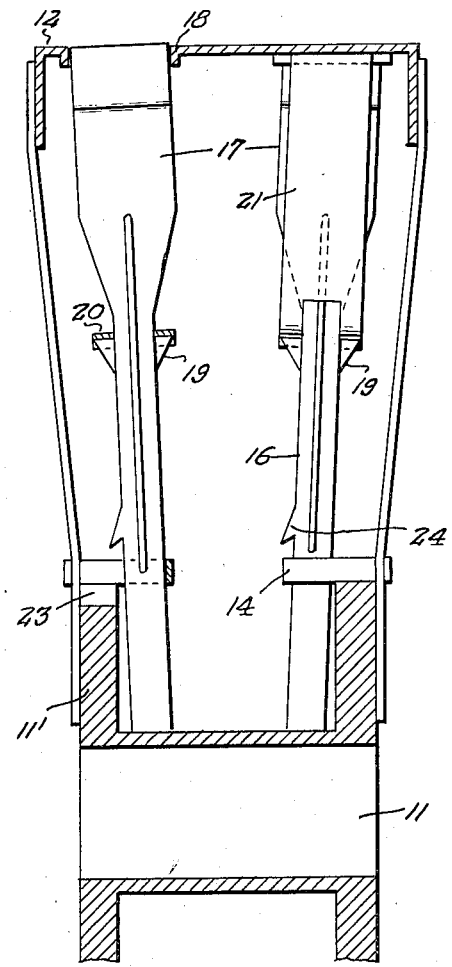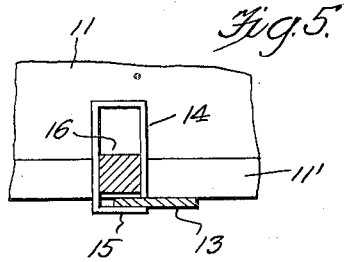

Patented July 31, 1934

1,968,471

UNITED STATES PATENT OFFICE 1,968,471

ADJUSTABLE WHEEL LUG

Ferdinand C. Veith and Henry C. Bowen, Upper Sandusky, Ohio

Application November 10, 1933, Serial No. 697,504

4 Claims. (Cl. 301—50)

This invention relates to vehicle wheels and more particularly to tractor wheels and has as its object the provision of improved adjustable lugs for wheels of this character.

In accordance with the present invention a tractor wheel is provided having lugs thereon which are projectable for use to increase traction, and retractible so as to permit of use of the wheel on roads without damaging the latter.

The invention together with its objects and advantages will be best understood from a study of the following description taken in connection with the accompanying drawings wherein:

Figure 1 is an elevational view of a portion of a wheel having the invention associated therewith, certain parts of the wheel being broken away and shown in section.

Figure 2 is a sectional view showing a portion of a wheel with the lugs shown in projected position.

Figure 3 is a view similar to Figure 2 with the lugs shown in retracted position, and Figures 4 and 5 are fragmentary detail sectional views illustrating certain details of construction to be hereinafter more fully referred to.

Referring to the drawings by reference numerals it will be seen that the wheel is indicated generally by the reference numeral 10 and includes essentially, a hub 11, a rim 12, and spokes 13 arranged on both sides of the wheel and connecting the rim 12 with the hub 11 as shown.

In accordance with the present invention each of the spokes 13 adjacent the hub 11 has a relatively small rectangular guide frame 14 extending inwardly therefrom and secured in any suitable manner at one end to the spoke 13 as at 15. Operating in the guide member 14 is the shank 16 of a traction lug 17 which latter, as clearly shown in Figure 2 operates through a flanged opening 18 provided in the rim 12 of the wheel. At the junction of the shank 16, and lug 17 there are provided on opposite sides of the shank 16 shoulders 19 with which are normally engaged the fingers 20 of a leaf spring 21 that is anchored as at 22 to the inner side of the rim 12. The spring 21 exerts a tension on the shank 16 for holding the lug 17 in either its projected or retracted position.

As clearly shown in Figures 2 and 3 the hub 11 is provided at the ends thereof with circular flanges 11' which form seats on which the lower end of the shank 16 rests when the lugs 17 are in the projected position shown in Figure 2. Obviously the springs 21 bearing on the shoulders 19 will serve to retain the ends of the shanks 16 seated against the edges of the flanges 11'.

It will also be apparent that when the lugs are in a retracted position, or in the position shown in Figure 3, the free or inner ends of the shanks 16 will engage on the periphery of the hub 11 between the flanges 11' and will be yieldably retained in engagement with the hub through the medium of the springs 21 acting on the shoulders 19. As also shown in Figure 3 the flanges 11' at their outer edges are provided with notches 23 to receive the ends of the shanks 16 when the lugs 17 are in projected position.

To facilitate the projection or retraction of the lug, the shank 16 of each lug is provided at the side thereof with an inclined projection 24 with which a lever or similar tool may be readily engaged to facilitate the manipulation of the shank 16 for projecting or retracting the lug 17 thereof.

Having thus described our invention, what is claimed as new is:

1. In a tractor wheel, a hub provided with opposed circular flanges, a rim, spokes connecting the rim with the hub, said rim having a plurality of apertures therein, lugs projectable through said apertures, shanks integral with the lugs and adapted to engage the edges of the flanges when the lugs are projected, and to engage the periphery of the hub between the flanges when the lugs are retracted, guides through which said shanks operate mounted on said spokes, and springs anchored to the rim and engaged with said shanks and yieldably urging the latter inwardly and in seated engagement with the hub or said flanges in accordance with the projected or retracted positions of the lugs.

2. In a vehicle wheel, and in combination, a hub provided with a flange, a rim, spokes connecting said hub and rim, said rim being provided with a series of apertures, lugs projectable through said apertures, said lugs being provided with shanks the inner ends of which are adapted to rest on the hub when the lugs are in retracted position, and on said flange when the lugs are in a projected position, guide elements mounted on said spokes and through which said shanks operate, shoulders on said shanks, leaf springs anchored at one end to the rim and having free ends engaging the shoulders for normally urging the inner ends of the shanks into engagement with either the hub or its flange optionally, and means on each of said shanks adapted to be engaged by a tool for effecting a manipulation of the shanks to project or retract the lugs.

3. A traction wheel comprising a hub, a rim, shank-equipped lugs adapted to project through the rim, means on the hub engageable with the inner ends of the shanks of the lugs to support the lugs in projected and retracted positions, lateral shoulders on said shanks, and leaf springs anchored at one end to the rim and having free ends straddling the shanks and engaging the shoulders in a manner tending to yieldably engage the inner ends of the shanks with the hub.

4. In a traction wheel, a hub provided with opposed circular flanges, a rim, traction lugs having shanks and adapted to project through the rim, said shanks being adapted to engage the edges of the flanges when the lugs are projected, and to engage the periphery of the hub between the flanges when the lugs are retracted, spring devices engaged with the shanks tending normally to move the shanks toward the hub, and said shanks being provided with projections for engagement with a lever or similar tool for manually projecting and retracting the lugs.

FERDINAND C. VEITH.
HENRY C. BOWEN.